July 16, 1946.    J. J. BLACK    2,404,121
CASTER TRAILER
Filed April 17, 1944    4 Sheets-Sheet 1

INVENTOR.
James J. Black
BY Wood, Arey, Herron & Evans
Attorneys.

July 16, 1946.　　　J. J. BLACK　　　2,404,121
CASTER TRAILER
Filed April 17, 1944　　　4 Sheets-Sheet 2

James J. Black INVENTOR.
BY Wood, Arey, Herron & Evans
Attorneys.

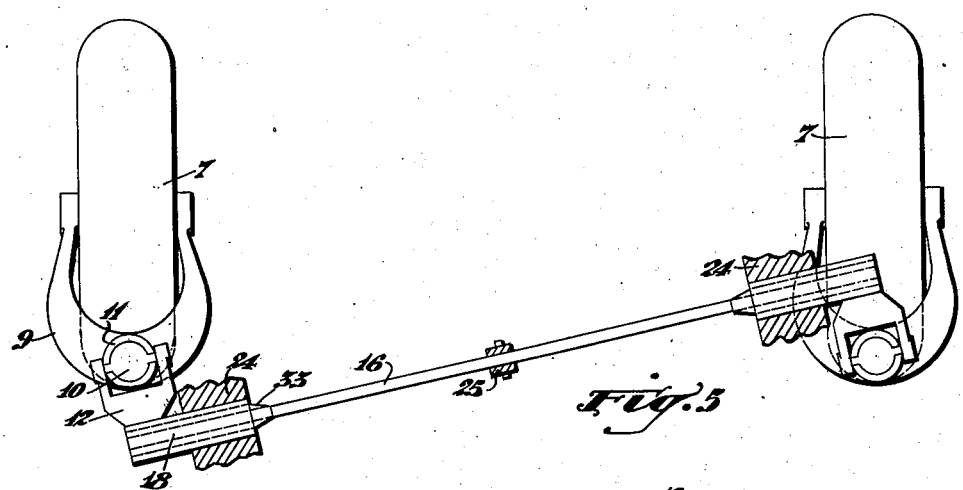
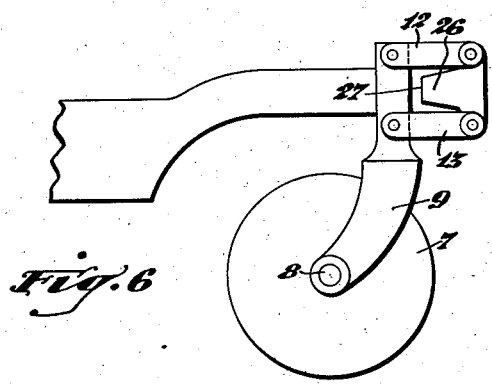
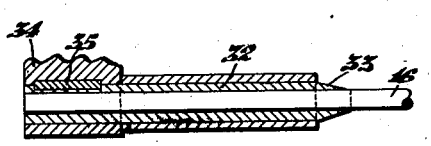
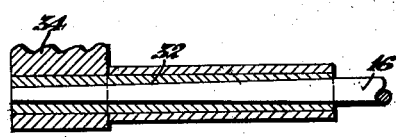

July 16, 1946.                J. J. BLACK                2,404,121
                            CASTER TRAILER
                    Filed April 17, 1944        4 Sheets-Sheet 4

INVENTOR.
James J. Black
BY Wood, Arey, Herron & Evans
Attorneys.

Patented July 16, 1946

2,404,121

UNITED STATES PATENT OFFICE 2,404,121

CASTER TRAILER

James J. Black, Cincinnati, Ohio, assignor to The Trailmobile Company, Cincinnati, Ohio, a corporation of Delaware Application April 17, 1944, Serial No. 531,406

5 Claims. (Cl. 280—33.4)

This invention relates to trailer vehicles of the type which are adapted to be towed by a tractor. The invention is directed particularly to trailer vehicles in which the wheels at the front ends of the structure are castered so that they do not tend to steer the vehicle but rather track behind the towing unit with its movements, and to facilitate the positioning or parking of the trailer when it is detached.

In conventional structures employing caster wheels mounted at the center of the front end of a trailer, a draw bar is attached directly between the frame and the pintle hook of the towing car so that the casters remain in contact with the ground. The disadvantage of this type of structure is that the wheels tend to plow into the soft center of a road and do not follow a direct course with the towing vehicle. Even under most favorable conditions the casters "flop" from one side to the other and thereby create a heavy towing load. Moreover, such wheels are difficult to mount resiliently if the pivotal mobility is to be preserved.

A principal objective of the invention has been to provide trailers having caster wheels at the opposite sides of the front ends of the structure which are movable in up and down directions but restrained as to movement so that a yieldable interconnection between the casters and the body of the vehicle is provided. In this structure the wheels yieldably are movable to accommodate themselves to local variations in the roadway contour.

A further objective of the invention has been to provide a mounting for the caster wheels in which the vertical movement of a wheel at one side of the vehicle is accompanied by a substantially equal and opposite movement of the wheel at the other side so that the body is maintained upon an even keel. In this respect a structure is contemplated in which an equalizing mechanism is employed to obtain the benefits of a three-point type of supension for a vehicle in which the load is carried, actually, upon four wheels or more.

In a further respect the invention contemplates a structure in which the caster wheels are yieldably mounted independently of one another and also equalized as to movement through crossconnection. The preferred mechanism involves the use of one or more shafts which are employed as torsion members through which a resilient mounting is obtained by torsional twisting of the shafts and through which equalization is obtained by shaft rotation. Local minor variations in the roadway contour to which the individual wheels may be subjected are absorbed by reason of their resilient mounting. However, if the towing vehicle is loaded heavily or if a heavy load is imposed upon the casters from the tow car, such as might occur if the tow car starts up a relatively abrupt incline before the trailer has reached the incline, then movement of the one wheel which would tend to alter the keel of the vehicle is offset by a countermovement equal in extent but opposite in direction.

In the preferred embodiments of the invention the caster wheels are supported individually upon levers pivotally interconnected with the frame whereby the wheels may move in up and down directions to accommodate themselves to local irregularities in the roadway, and the shaft means previously referred to is one or more twistable elements interconnected with the levers or wheel mountings whereby independent movement of each wheel is resiliently controlled through twisting or so-called "wind-up" thereof. The shaft means, however, bears the weight loading of the vehicle and is rotatable for imparting compensating movements from one wheel to the other.

Other embodiments of the invention contemplate the use of torsion shafts for springing of the castor wheels without a compensating feature, as well as stiff shafts for compensation of the wheels without yieldability or "wind-up." In any of these forms, however, a simple mounting is provided in which free pivotal movement of the caster wheels is preserved throughout their entire circle of rotatability in conjunction with control of their movements.

In a typical structure the caster wheels are rotatably journaled in forks; the forks are swung for movement vertically upon levers mounted on the frame, and a shaft extends laterally across the vehicle into rigid connection with the caster forks whereby the upward movement of one caster fork exerts a twisting force upon the shaft to spring the other caster and vice versa. By connecting the shaft to the casters at respectively opposite points thereon, or through the use of suitable bell cranks the torsion shaft means is caused to act as a compensating device.

From the foregoing description of the principles upon which the invention is predicated and from the following detailed description of the drawings which show representative embodiments of the improvements, those skilled in the art readily will comprehend the various modifications to which the invention is susceptible.

In the drawings:

Figure 5 is a plan view similar to Figure 3, showing a modified form of the invention.

Figure 6 is a side elevation showing the lever mounting of the caster to the frame and connection therewith to the control shaft means.

Figures 9 and 10 are views showing interconnection of the shaft means with the casters or levers as the case may be, whereby failure of the shaft through torsional loading is prevented.

Figure 1:
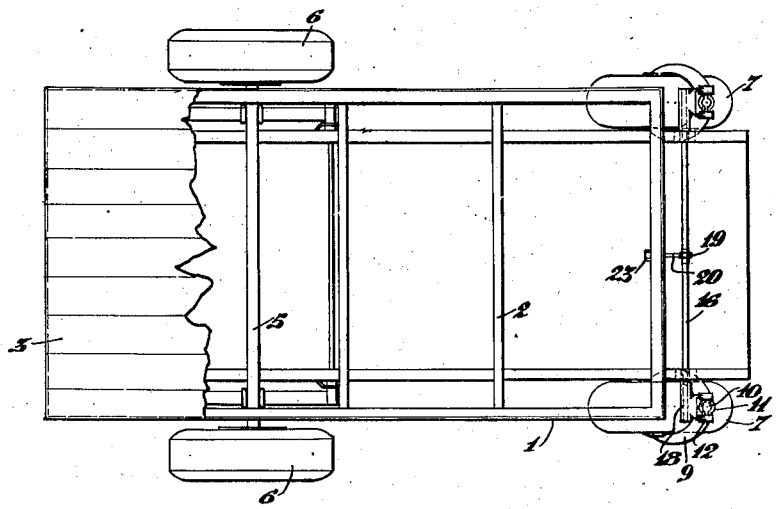
Figure 1 is a plan view of an entire trailer structure, the front end constructed in accordance herewith and showing the organization of the caster and control shaft means therefor.
Figure 2:
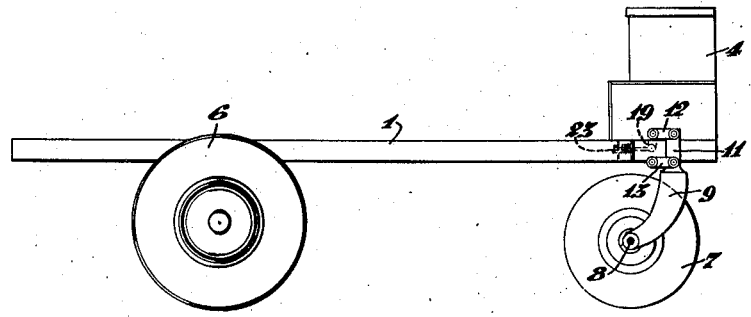
Figure 2 is a side view of the trailer shown in Figure 1.

The trailer in which the present improvements are utilized may be of the usual type as shown in Figures 1 and 2 consisting of a frame 1 which is stiffened by cross bolsters 2. The frame carries the usual deck 3 upon which may be mounted the front boss 4. At the rear part of the trailer a stiff axle 5 is provided to rotatably support the rear wheels 6, while caster wheels, designated 7, are located at the front end of the trailer, one at each side thereof. These wheels preferably are smaller in diameter than the rear wheels and are rotatably supported upon axles 8 which are carried in forks 9, one for each wheel, the forks being configurated so that the axes through the shafts 10 are laterally offset from the axles 8 whereby pivotal action of the casters is obtained.

Figure 3:
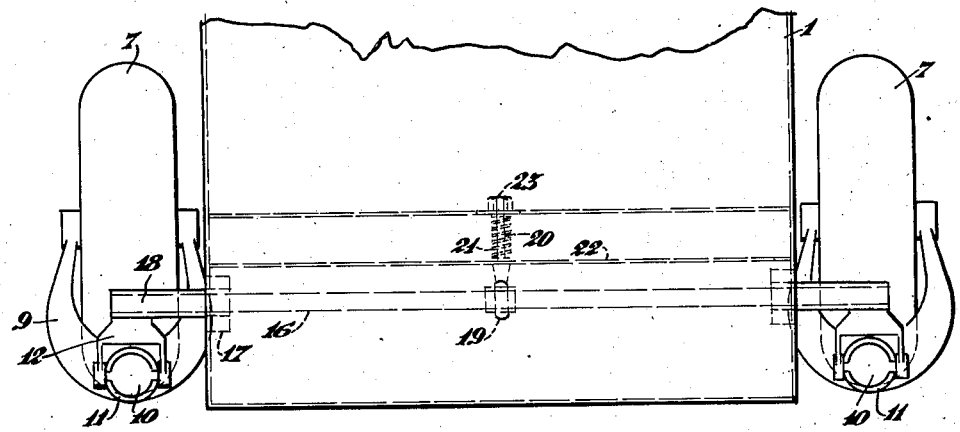
Figure 3 is an enlarged plan view of the front part of the trailer structure as shown in Figure 1.

Shafts 10 are rotatably journalled in sleeves 11 and each sleeve has aligned pairs of bosses extending in opposite directions from its outer periphery. These bosses carry levers 12 and 13, one pair of levers at each side of the sleeve. In place of individual levers the upper and the lower pairs may be in the form of forks or shackles as shown in plan view in Figures 1 and 3. These shackles are rotatably connected through the frame whereby the levers are free to swing and permit the caster and wheel unit to move in an up and down direction as indicated by the arrows in Figure 4. Thus, one of the shackles, i. e. 13, is connected to the frame through a stub shaft 14 which extends from a pillow block 15 mounted on the frame, while the other of the shackles, i. e. 12, is fastened rigidly to a shaft 16 which is journalled in a pillow block 17 supported by the frame, the shaft 16 constituting the control shaft means through which vertical movement of the caster is controlled. As shown in Figure 3, shaft 16 forms a rigid connection with the shackle through a sleeve 18 and extends across the vehicle into connection with the other caster wheel assembly in the manner just described.

At the central part of the vehicle, shaft 16, if desirable, may carry a supplemental spring lever 19 which has a rod 20 loosely connected with it at its free end. The rod passes through a compression spring 21 which is seated upon a face of a cross bolster 22 of the frame while the rod carries a nut 23 at another portion of the bolster channel having a clearance aperture through which the nut may pass. It will be observed that if the shaft 16 is torsionally rigid then yieldability is provided primarily through the compression spring 21. However, in the alternative, part of the spring load, if desirable, may be absorbed through twisting of the shaft and part through the compression spring. Neglecting any yieldability that may be provided through the compression spring if it is employed, it will be seen that the wheels are crossconnected and sprung through a shaft 16 which is common to them.

Figure 4:
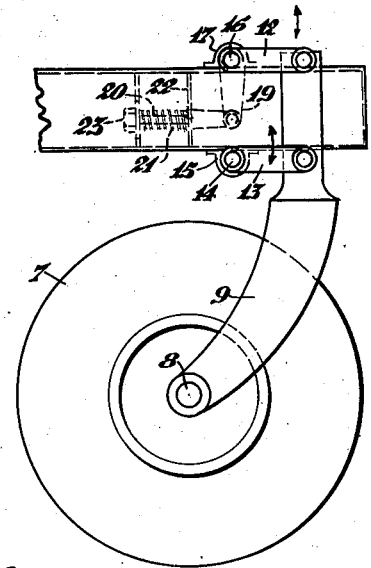
Figure 4 is a side elevation of a caster wheel showing the lever connection thereof to the vehicle frame.

To illustrate the operation of the device it may be supposed, for example, that the wheel at the right-hand of the vehicle, as shown in Figure 4, hits an obstruction and must move upwardly. The shackles 12 and 13 permit this upward movement and swing through arcs as indicated by the arrows. However, inasmuch as one of the shackles is in rigid connection with the cross shaft 16 this upward movement is imposed upon the cross shaft as a twisting movement. This shaft therefore is twisted or loaded torsionally in accordance with the upward movement of the caster as governed, of course, by the weight loading of the trailer. The twisting movement also may cause rotation of the shaft 16 at its opposite end which in turn exerts a lifting force upon the other wheel assembly. Therefore, differences in the terrain over which the caster wheels are moving are accommodated by winding or twisting of the shaft between the center fastening and shackle on each end.

In the apparatus shown in Figure 5, the casters are mounted upon levers or shackles in the manner just described but, in this case, the cross shaft 16 is interconnected with the wheel units at oppositely disposed points. For instance, the levers face in opposite directions, one set to the front and one set to the rear of the trailer at suitable angles for interconnection of the cross shaft. Connection sleeves 18 through which the shaft is mounted to each shackle are elongated and rotatably pass through journals 24 supported from the frame. Thus, if the wheel shown at the left hand side of Figure 5 is raised the shaft 16 is rotated in the direction of the arrow and this rotation in turn effects a downward movement of the wheel assembly at the left hand side of the apparatus whereby the net effect upon the body of the vehicle is a lowering movement just half the distance which the left hand was raised. If the raising movement is abrupt the shaft twists to absorb the momentary shock whereby a resilient effect is displayed. It is preferable to stabilize the central portion of the shaft 16 against whipping by journalling it within a rubber bearing 25 or the like.

It is necessary that the cross shaft be protected against torsional overloading. The buttress marked 26 as shown in Figure 6 serves this function. As the wheel assembly moves in a vertical direction the levers or the shackles 12 and 13 are swung on their pivot points whereby the outer sleeve 11 in which the caster fork is journalled approaches the abutting face 27 of the member 26. This face therefore serves as a positive stop which after a predetermined amount of movement has taken place limits further movement to relieve the suspension system of the wheels from further loading.

Figure 8:
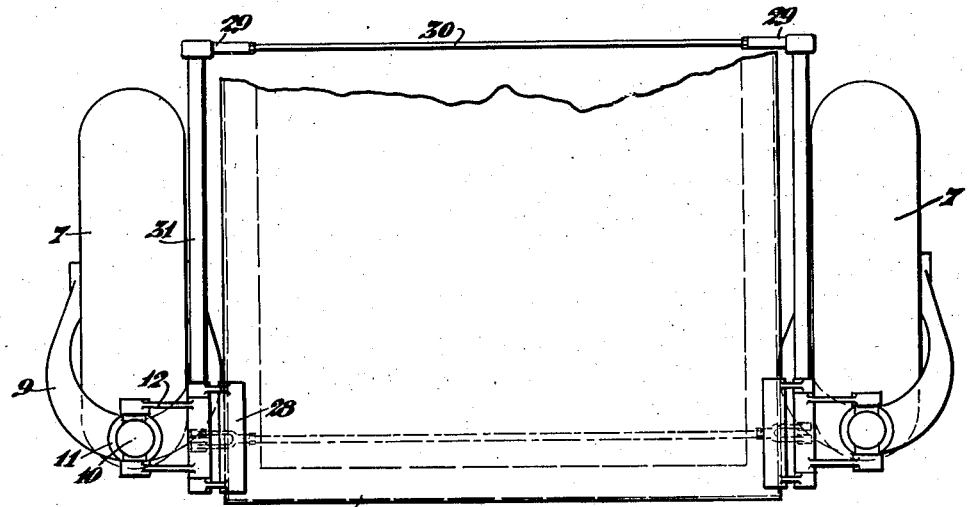
Figure 8 is a plan view of the form shown in Figure 7.
Figure 7:
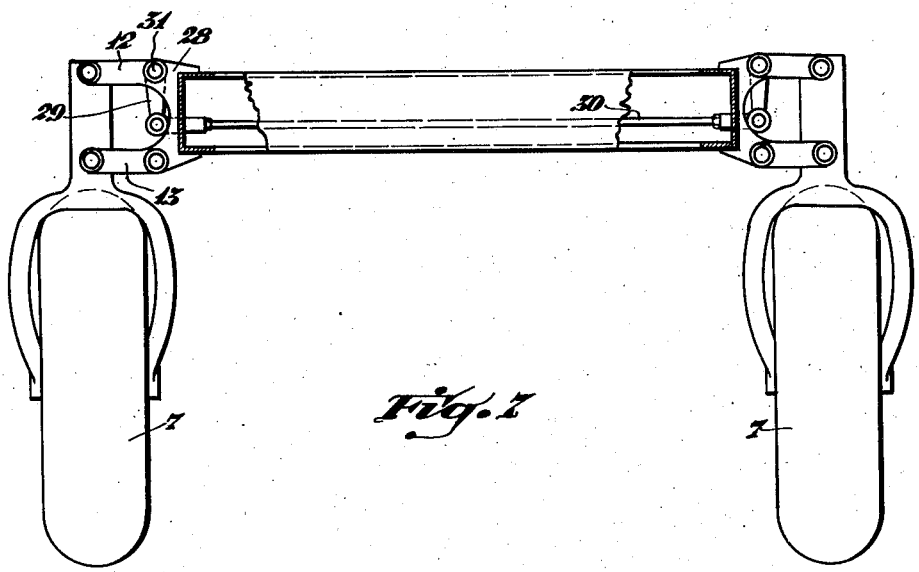
Figure 7 is an end elevation of another modified form of the invention.

A modified form of structure is shown in Figures 7 and 8. Here the shackles 12 and 13 extend in directions laterally of the frame from bolsters 28 which are mounted on the frame. The connection between the free ends of the shackles and the bolsters is formed through pins which may be elongated to constitute shafts subjected to a twisting force commensurate with vertical wheel movement. For cross connection between the wheel units, these shafts are provided with bell cranks 29 mounted thereon rigidly, and the free ends of the bell cranks are interconnected by means of a tie rod 30. In the operation of this form of apparatus a lifting movement of, say, the caster unit at the left hand side of Figure 7, is accompanied by rotation of the pin 31 on which the bell crank 29 is mounted. The lower end of the crank 29 therefore moves toward the left and the wheel at the opposite side of the vehicle is lowered.

If equalization of wheel movements is desired without torsional springing then the shafts 31 may be shortened to project just beyond the caster brackets to carry the bell cranks 29; in this embodiment the shafts are not long enough to be twisted appreciably.

Various torsion shafts adapted to be used as resilient members for absorbing shocks and providing yieldability have been proposed in the past. However, the principal problem in the use of them has been to avoid their failure, after a relatively short period of usage, through rupture or fatigue. In conventional practice a shaft which is to be subjected to torsion has an end connection formed upon it, usually by forging, in order that the shaft may be fastened rigidly to a shackle or a lever. For instance the end of the shaft is forged into a square and the shackle or the lever is connected to this portion in order that the two will be held together in non-rotatable relationship. Sometime the lever, shackle, or the like is fastened by welding. In such instances, however, the metal structure is altered and strains occur at localized areas at which the shaft eventually fails.

It has been discovered, however, that fatigue and failure of the shaft for such reasons may be avoided through connections which are characterized in that the engagement of the shaft and the cooperating member is primarily a pressure engagement in which the pressure between the members, around any line peripherally of the shaft, is substantially uniform but varies from maximum to minimum or zero over a substantial distance in a direction longitudinally of the shaft. Representative connections of this type are shown in Figures 9 and 10. The pressure may be made by means of a shrink fit of one of the parts which is appropriately weakened from end to end so that the pressure with which it embraces its mating element varies throughout the length of engagement, or the connection may be made through a relative taper of one member with respect to the other.

The joints of both type provide pressure forces which are distributed over a substantial distance of the shaft as measured in its longitudinal direction. Thus focal points at which high stresses are localized are not present in such structures.

According to the arrangement shown in Figure 10 there is a relatively slight taper between the shaft and the bore which is to receive it, that is, the bore is slightly larger at its inward end than at the outer end. The shaft itself is uniform in diameter. Therefore, when the shaft is pressed into the tapered bore the pressure of engagement between the two increases gradually toward the outer end of the shaft and is at a minimum at a distance spaced inwardly from the end of the shaft. When the major diameter of the tapered bore, i. e., at its inward end equals the diameter of the shaft, then the pressure is zero at the point adjacent the major diameter and increases to a maximum at the opposite end of the connection.

As shown in Figure 9, a similar result is obtained by configurating one of the parts, gradually, to weaken it, so that the pressure of engagement varies because of its weakness. Thus, a sleeve 32 is shrunk upon the shaft either by means of heating it or by means of cooling the shaft itself. This sleeve is chamfered or tapered at one end as at 33. At this point the wall thickness of the sleeve is thinnest and it is, therefore, incapable of embracing the shaft at the same pressure as that which occurs where the wall thickness is of full dimension. By means of a shrink fit a firm connection between the two members is established but in this embodiment, as in the other, there is still no abrupt variation in the pressure of engagement at which fatigue of a shaft may become localized.

In the structure shown in both Figures 9 and 10 the members 34 connected to the shafts are mounted upon the sleeves in a suitable manner, as by keying 35, or by shrink fit, or by welding. It is to be observed that the sleeve forms a transition member through which the rigid connection is provided. It will be understood that the sleeves may be omitted and that the members 34 will be connected directly to the shaft in the manner just described. It also will be understood that the connection is established primarily through pressure but that the parts also may be welded, for instance, at the ends of the shaft as a further means of insuring permanence of the union. In such instances, however, the welding, being located at the outer end of the shaft, is not subjected to the main torsional loads and therefore does not form a focal point at which fatigue can occur.

Aside from the fact that connections of this type insure against shaft failure, they may be formed more easily and economically than forged or welded connections of the type used in the past. Thus, the shaft member may be of uniform diameter, preferably ground to a straight finish or it may be used in a cold rolled condition without further machining although appropriate heat treating to provide toughness is desirable. The bore in the member which the shaft is to receive may be drilled and reamed or taper reamed as the case may be, after which the parts are ready to be united.

Having described my invention, I claim:

1. A trailer vehicle comprising a frame, caster wheels located at opposite sides of said frame, levers pivotally interconnecting said casters with said frame for movement of the casters in a substantially vertical direction, and shaft means in common torsional connection with said levers and responsive to vertical movement of either one of said casters, for exerting a compensating effect upon the other.

2. A trailer vehicle comprising a frame, caster wheels located at opposite sides of said frame, levers pivotally interconnecting said casters with said frame for movement of the casters in a substantially vertical direction, and shaft means common to said casters and constituting a shaft subjected to torsion through movement of said casters in a vertical direction.

3. A trailer vehicle comprising a frame, caster wheels located at opposite sides of said frame, levers pivotally interconnecting said casters with said frame for movement of the casters in a substantially vertical direction, and shaft means interconnecting said casters at respectively opposite points thereon whereby vertical movement of the caster at one side of the vehicle effects movement of the caster at the other side of the vehicle in an opposite direction torsionally through said shaft means.

4. In a trailer vehicle having a frame, a shaft rotatably supported on said frame, levers connected with said shaft at opposite sides of said frame, forks respectively pivotally connected with said levers, additional levers spaced from the first pivotally interconnecting said forks with said frame and caster wheels rotatably supported by said forks, said shaft constituting a cross connection between said forks which is subject to torsion when one of the caster wheels tends to move upwardly or downwardly independently of the other.

5. In a trailer vehicle having a frame, levers in pairs respectively mounted upon said frame at opposite sides thereof, forks respectively pivotally connected to the free ends of said levers whereby said forks are mounted upon said frame for movement in vertical directions, one of the levers of each pair being connected in common by a torsion shaft extending crosswisely between them, whereby movement of one fork independently of the other is controlled by said shaft.

JAMES J. BLACK.